United States Patent
Lesot et al.

(10) Patent No.: US 7,606,977 B2
(45) Date of Patent: Oct. 20, 2009

(54) CONTEXT SAVE AND RESTORE WITH A STACK-BASED MEMORY STRUCTURE

(75) Inventors: Jean-Philippe Lesot, Etrelles (FR); Gilbert Cabillic, Brece (FR)

(73) Assignee: Texas Instruments Incorporated, Dallas, TX (US)

(*) Notice: Subject to any disclaimer, the term of this patent is extended or adjusted under 35 U.S.C. 154(b) by 628 days.

(21) Appl. No.: 11/188,411

(22) Filed: Jul. 25, 2005

(65) Prior Publication Data
US 2006/0026357 A1 Feb. 2, 2006

(51) Int. Cl.
*G06F 12/00* (2006.01)
*G06F 13/00* (2006.01)

(52) U.S. Cl. .............. 711/132; 711/100; 711/118; 711/129; 711/154

(58) Field of Classification Search ............ 711/100, 711/117, 118, 119, 129, 154, 173, 132
See application file for complete search history.

(56) References Cited

U.S. PATENT DOCUMENTS

| 6,604,168 B2* | 8/2003 | Ogawa ............... 711/103 |
| 6,772,310 B2* | 8/2004 | Thompson et al. ....... 711/166 |
| 6,915,307 B1* | 7/2005 | Mattis et al. ............ 707/103 R |
| 6,988,167 B2* | 1/2006 | Allen et al. ............. 711/128 |
| 7,032,158 B2* | 4/2006 | Alvarez et al. .......... 714/763 |
| 7,065,613 B1* | 6/2006 | Flake et al. ............ 711/132 |
| 7,200,721 B1* | 4/2007 | Lang et al. ............. 711/141 |

\* cited by examiner

*Primary Examiner*—Tuan V. Thai
(74) *Attorney, Agent, or Firm*—Ronald O. Neerings; Wade James Brady, III; Frederick J. Telecky, Jr.

(57) ABSTRACT

A multi-threaded processor adapted to couple to external memory comprises a controller and data storage operated by the controller. The data storage comprises a first portion and a second portion, and wherein only one of the first or second portions is active at a time, the non-active portion being unusable. When the active portion does not have sufficient capacity for additional data to be stored therein, the other portion becomes the active portion. Upon a thread switch from a first thread to a second thread, only one of the first or second portions is cleaned to the external memory if one of the first or second portions does not contain valid data.

20 Claims, 9 Drawing Sheets

| R0 | GENERAL PURPOSE (GP) |
|---|---|
| R1 | GENERAL PURPOSE (GP) |
| R2 | GENERAL PURPOSE (GP) |
| R3 | GENERAL PURPOSE (GP) |
| R4 | GENERAL PURPOSE (GP) |
| R5 | GENERAL PURPOSE / LOCAL VARIABLE POINTER (LV) |
| R6 | STACK POINTER (SP) |
| R7 | TOP OF STACK (ToS) |
| R8 | GENERAL PURPOSE (GP) |
| R9 | GENERAL PURPOSE (GP) |
| R10 | GENERAL PURPOSE (GP) |
| R11 | GENERAL PURPOSE (GP) |
| R12 | GENERAL PURPOSE (GP) |
| R13 | GENERAL PURPOSE (GP) |
| R14 | GENERAL PURPOSE (GP) |
| R15 | STATUS AND CONTROL (ST) |

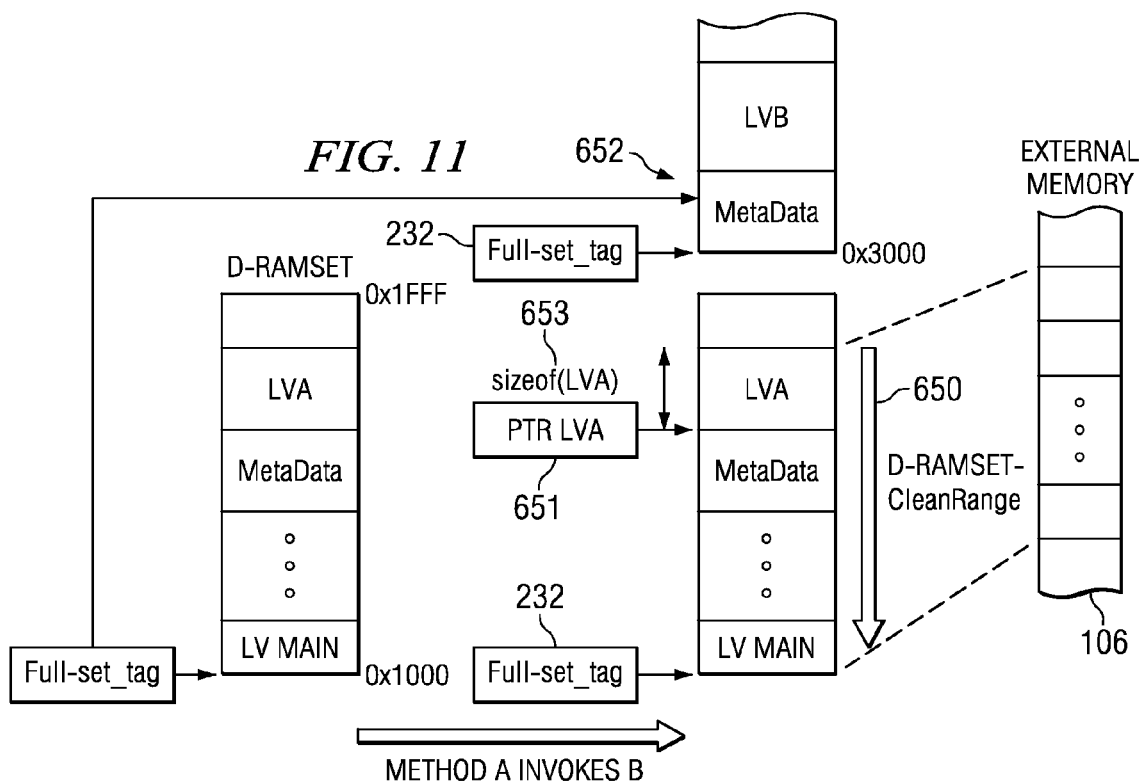
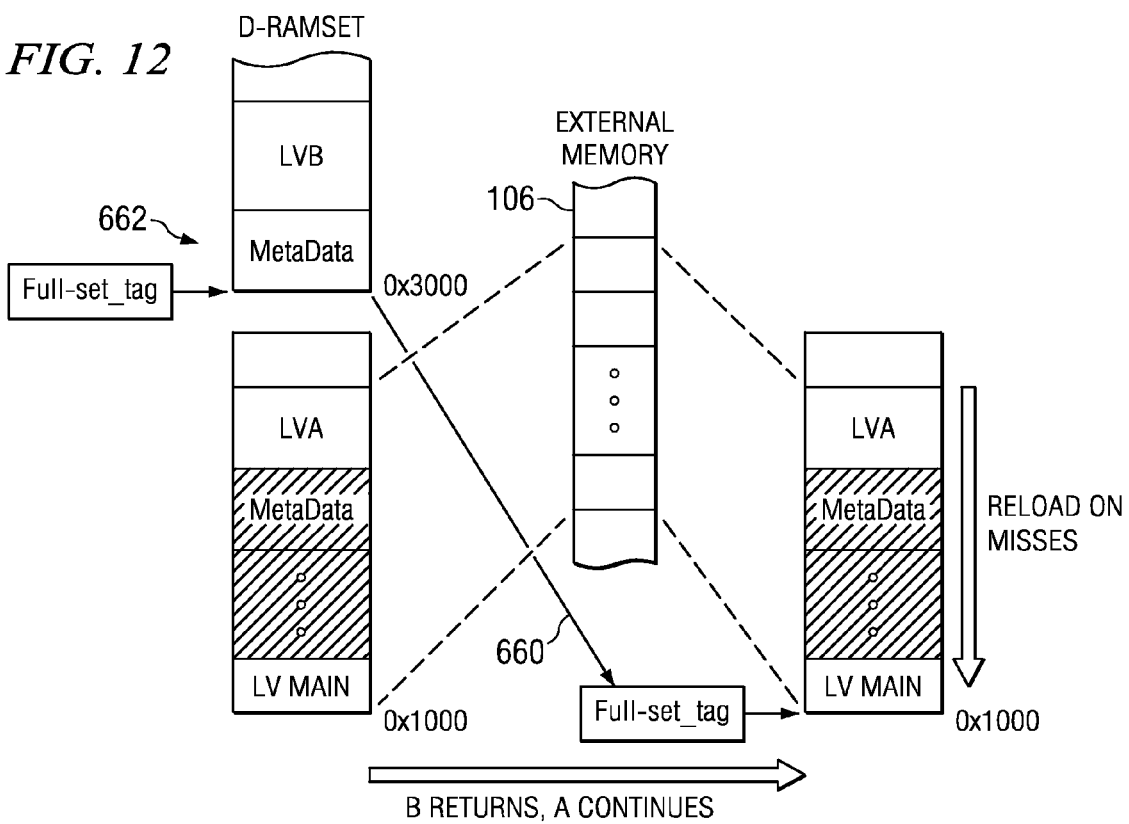

CONTEXT SAVE AND RESTORE WITH A STACK-BASED MEMORY STRUCTURE

CROSS REFERENCE TO RELATED APPLICATIONS

This application claims priority to European Patent Application No. 04291918.3, filed on Jul. 27, 2004 and incorporated herein by reference. This application also contains subject matter that may be related to U.S. patent applications Ser. No. 10/818,584 entitled "Management of Stack-Based Memory Usage in a Processor, Ser. No. 10/632,067 entitled "Memory Management of Local Variables," 10/632,076 entitled "Memory Management of Local Variables Upon a Change of Context," Ser. No. 10/632,228 entitled "System and Method to Automatically Stack and Unstack Java Local Variables." This applications also contains subject matter that may be related to concurrently filed applications entitled "Memory Usable In Cache Mode Or Scratch Pad Mode To Reduce The Frequency Of Memory Accesses" and "Cache Memory Usable As Scratch Pad Storage".

BACKGROUND OF THE INVENTION

1. Technical Field of the Invention

The present disclosure relates generally to processors and more particularly to the use of cache memory as scratch pad storage.

2. Background Information

Many types of electronic devices are battery operated and thus preferably consume as little power as possible. An example is a cellular telephone. Further, it may be desirable to implement various types of multimedia functionality in an electronic device such as a cell phone. Examples of multimedia functionality may include, without limitation, games, audio decoders, digital cameras, etc. It is thus desirable to implement such functionality in an electronic device in a way that, all else being equal, is fast, consumes as little power as possible and requires as little memory as possible. Improvements in this area are desirable.

BRIEF SUMMARY

In at least some embodiments, a multi-threaded processor adapted to couple to external memory comprises a controller and data storage operated by the controller. The data storage comprises a first portion and a second portion, and wherein only one of the first or second portions is active at a time, the non-active portion being unusable. When the active portion does not have sufficient capacity for additional data to be stored therein, the other portion becomes the active portion. Upon a thread switch from a first thread to a second thread, only one of the first or second portions is cleaned to the external memory if one of the first or second portions does not contain valid data.

In another embodiment, a system comprises a communications transceiver, a controller, and data storage. The data storage comprises a first portion and a second portion, and wherein only one of the first or second portions is active at a time, the non-active portion being unusable. When the active portion does not have sufficient capacity for additional data to be stored therein, the other portion becomes the active portion. Upon a thread switch from a first thread to a second thread, only one of the first or second portions is cleaned to the external memory if one of the first or second portions does not contain valid data.

In yet another embodiment, a method comprises using only a first portion of a cache memory data array to store local variables until the first portion has insufficient capacity for storing additional local variables. The cache memory data array comprising the first portion and a second portion. Once the first portion has insufficient capacity for storing additional local variables, using only the second portion of the cache memory data to store the additional local variables and not using the first portion. When the second portion has insufficient capacity for storing additional local variables, copying the local variables from only the first portion to external memory. The method further comprises switching from a first thread to a second thread and, upon switching to the second thread, cleaning only one of the first or second portions to the external memory if one of the first or second portions does not contain valid data.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections. The terms "first portion" and "second portion" are intended to broadly refer to either portion of the multi-portion RAMset explained below.

BRIEF DESCRIPTION OF THE DRAWINGS

For a more detailed description of the preferred embodiments of the present invention, reference will now be made to the accompanying drawings, wherein:

FIGS. 10 and 11 illustrate the operation of the RAMset in an overflow condition;

FIG. 12 illustrates the operation of the RAMset in an underflow condition;

DETAILED DESCRIPTION OF THE PREFERRED EMBODIMENTS

Figure 1:
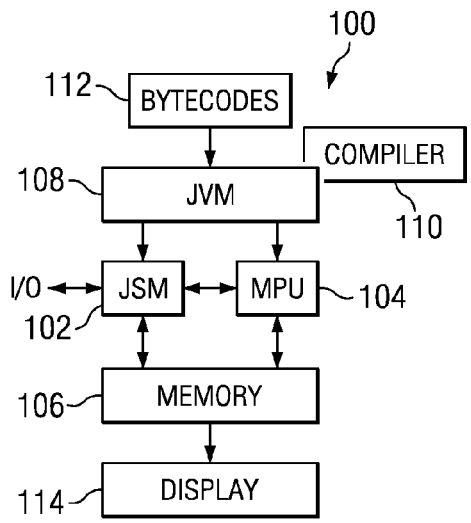
FIG. 1 shows a diagram of a system in accordance with preferred embodiments of the invention and including a Java Stack Machine ("JSM") and a Main Processor Unit ("MPU")

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

The subject matter disclosed herein is directed to a programmable electronic device such as a processor having memory in which "local variables" associated with a stack-based language (e.g., Java) and pointers associated with the local variables may be stored. The term "local variables" refers to temporary variables used by a method that executes on the processor. Multiple methods may run on the processor and each method preferably has its own set of local variables. In general, local variables have meaning only while their associated method is running. The stack-based language may comprise Java Bytecodes although this disclosure is not so limited. In Java Bytecodes, the notion of local variables ("LVs") is equivalent to automatic variables in other programming languages (e.g., "C") and other termed variables in still other programming languages. This disclosure, however, is not limited to Java, Java methods, and Java local variables. The principles disclosed below are applicable to any system that manages a stack and includes "put block" and "pop block" operations to push a block of data onto a stack or pop a block of data from a stack.

The following describes the operation of a preferred embodiment of such a processor in which the methods and local variables may run and be used. Other processor architectures and embodiments may be used and thus this disclosure and the claims which follow are not limited to any particular type of processor. The processor described herein is capable of multi-threaded operation. Upon a change of one execution thread to another, one or more local variables and/or other information related to the former thread may desirably be saved off to memory to use processor resources for local variables and other information specific to the new thread. An efficient thread context switch is disclosed.

The processor described herein is particularly suited for executing Java™ Bytecodes, or comparable code. As is well known, Java is particularly suited for embedded applications. Java is a relatively "dense" language meaning that on average each instruction may perform a large number of functions compared to various other programming languages. The dense nature of Java is of particular benefit for portable, battery-operated devices that preferably include as little memory as possible to save space and power. The reason, however, for executing Java code is not material to this disclosure or the claims that follow.

Figure 2:
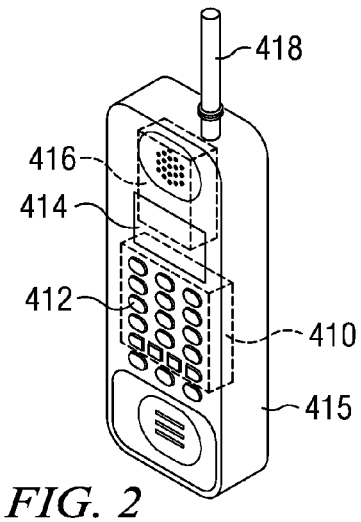
FIG. 2 depicts an exemplary embodiment of the system described herein in the form of a communication device (e.g., cellular telephone)

Referring now to FIG. 1, a system 100 is shown in accordance with a preferred embodiment of the invention. As shown, the system includes at least two processors 102 and 104. Processor 102 is referred to for purposes of this disclosure as a Java Stack Machine ("JSM") and processor 104 may be referred to as a Main Processor Unit ("MPU"). System 100 may also include memory 106 coupled to both the JSM 102 and MPU 104 and thus accessible by both processors. At least a portion of the memory 106 may be shared by both processors meaning that both processors may access the same shared memory locations. Further, if desired, a portion of the memory 106 may be designated as private to one processor or the other. System 100 also includes a Java Virtual Machine ("JVM") 108, compiler 110, and a display 114. The JSM 102 preferably includes an interface to one or more input/output ("I/O") devices such as a keypad to permit a user to control various aspects of the system 100. In addition, data streams may be received from the I/O space into the JSM 102 to be processed by the JSM 102. Other components (not specifically shown) may be included as desired. As such, while system 100 may be representative of, or adapted to, a wide variety of electronic systems, an exemplary electronic system may comprise a battery-operated, mobile cell phone such as that shown in FIG. 2. As shown in FIG. 2, a mobile communications device includes an integrated keypad 412 and display 414. The JSM 102 and MPU 104 noted above and other components may be included in electronics package 410 which may be coupled to keypad 410, display 414, and a communications transceiver (e.g., radio frequency ("RF") circuitry) 416 which may be connected to an antenna 418.

Referring again to FIG. 1, as is generally well known, Java code comprises a plurality of "Bytecodes" 112. Bytecodes 112 may be provided to the JVM 108, compiled by compiler 110 and provided to the JSM 102 and/or MPU 104 for execution therein. In accordance with a preferred embodiment of the invention, the JSM 102 may execute at least some, and generally most, of the Java Bytecodes. When appropriate, however, the JSM 102 may request the MPU 104 to execute one or more Java Bytecodes not executed or executable by the JSM 102. In addition to executing Java Bytecodes, the MPU 104 also may execute non-Java instructions. The MPU 104 also hosts an operating system ("O/S") (not specifically shown), which performs various functions including system memory management, the system task management that schedules the JVM 108 and most or all other native tasks running on the system, management of the display 114, receiving input from input devices, etc. Without limitation, Java code may be used to perform any one of a variety of applications including multimedia, games or web based applications in the system 100, while non-Java code, which may comprise the O/S and other native applications, may still run on the system on the MPU 104.

The JVM 108 generally comprises a combination of software and hardware. The software may include the compiler 110 and the hardware may include the JSM 102. The JVM may include a class loader, bytecode verifier, garbage collector, and a bytecode interpreter loop to interpret the bytecodes that are not executed on the JSM processor 102.

Figure 3:
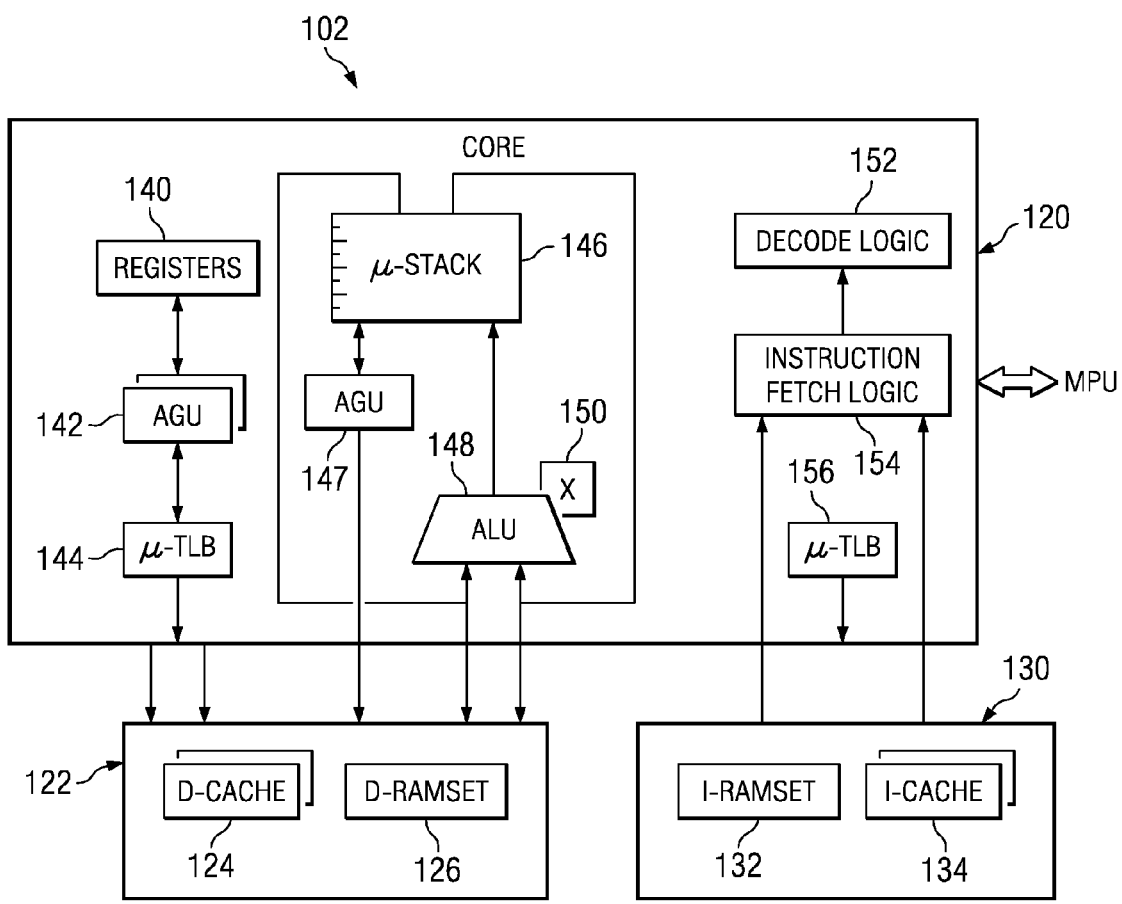
FIG. 3 shows a block diagram of the JSM of FIG. 1 in accordance with a preferred embodiment of the invention.

FIG. 3 shows an exemplary block diagram of the JSM 102. As shown, the JSM includes a core 120 coupled to data storage 122 and instruction storage 130. The core may include one or more components as shown. Such components preferably include a plurality of registers 140, three address generation units ("AGUs") 142, 147, micro-translation lookaside buffers (micro-TLBs) 144, 156, a multi-entry micro-stack 146, an arithmetic logic unit ("ALU") 148, a multiplier 150, decode logic 152, and instruction fetch logic 154. In general, operands may be retrieved from data storage 122 or from the micro-stack 146, processed by the ALU 148, while instructions may be fetched from instruction storage 130 by fetch logic 154 and decoded by decode logic 152. The address generation unit 142 may be used to calculate addresses based, at least in part on data contained in the registers 140. The micro-TLBs 144, 156 generally perform the function of a cache for the address translation and memory protection information bits that are preferably under the control of the operating system running on the MPU 104.

Figures 4, 8:
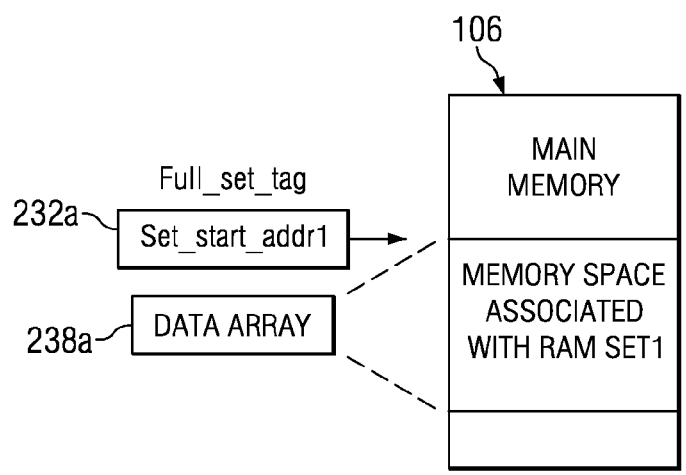
FIG. 4 shows various registers used in the JSM of FIGS. 1 and 3.
FIG. 8 illustrates the mapping of a contiguous block of main memory onto a RAMset.

Referring now to FIG. 4, the registers 140 may include 16 registers designated as R0-R15. All registers are 32-bit registers in accordance with the preferred embodiment of the invention. Registers R0-R5 and R8-R14 may be used as general purpose ("GP") registers, thereby usable for any purpose by the programmer. Other registers, and at least one of the GP purpose registers, may be used for specific functions. For example, in addition to use as a GP register, register R5 may be used to store the base address of a portion of memory in which Java local variables may be stored when used by the current Java method. The top of the micro-stack 146 is reflected in registers R6 and R7. The top of the micro-stack has a matching address in memory pointed to by register R6. The values contained in the micro-stack are the latest updated values, while their corresponding values in memory may or may not be up to date. Register R7 provides the data value stored at the top of the micro-stack. Register R15 is used for status and control of the JSM 102. Other registers may also be provided in the JSM 102, such as one or more auxiliary registers in the decode logic 152.

Referring again to FIG. 3, as noted above, the JSM 102 is adapted to process and execute instructions from a stack-based instruction set that may include Java Bytecodes. Java Bytecodes pop, unless empty, data from and push data onto the micro-stack 146. The micro-stack 146 preferably comprises the top n entries of a larger stack that is implemented in data storage 122.

The data storage 122 generally comprises data cache ("D-cache") 124 and a data random access memory ("D-RAM-set") 126. The D-RAMset (or simply "RAMset") 126 preferably comprises one "way" of the multi-way cache. Reference may be made to applications U.S. Ser. No. 09/591,537 filed Jun. 9, 2000, Ser. No. 09/591,656 filed Jun. 9, 2000, and Ser. No. 09/932,794 filed Aug. 17, 2001, all of which are incorporated herein by reference. The stack (excluding the micro-stack 146), arrays and non-critical data may be stored in the D-cache 124, while Java local variables and associated pointers as explained below, as well as critical data and non-Java variables (e.g., C, C++) may be stored in D-RAMset 126. The instruction storage 130 may comprise instruction RAM ("I-RAMset") 132 and instruction cache ("I-cache") 134. The I-RAMset 132 may be used to store "complex" micro-sequenced Bytecodes or micro-sequences or predetermined sequences of code.

In accordance with a preferred embodiment of the invention, at least some applications executed by the JSM 102 comprise one or more methods. A "method" includes executable instructions and performs one or more functions. Other terms for "method" may include subroutines, code segments, and functions, and the term should not be used to narrow the scope of this disclosure.

Figure 5:
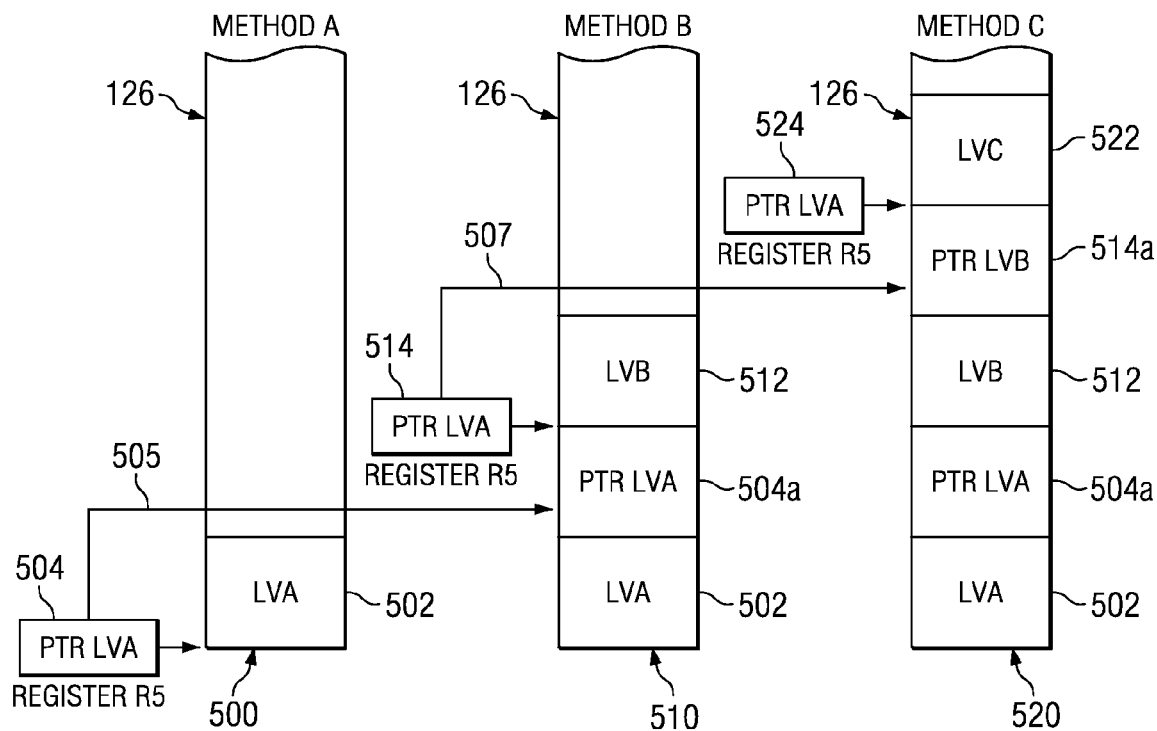
FIG. 5 illustrates the storage of local variables and pointers in accordance with the preferred embodiments.

A method (the "calling" method) may call another method (the "called" method). Once the called method performs its function, program control returns to the calling method. Multiple hierarchical levels of methods are possible as illustrated in FIG. 5 which illustrates the interaction between three methods (Method A, Method B, and Method C). For purposes of the example of FIG. 5, method A calls method B and method B calls method C. As such, method A is the calling method for method B which is the called method relative to method A. Similarly, method B is the calling method relative to method C which is considered the called method relative to method B.

A method may have one or more "local variables," as explained previously. Local variables may be used to temporarily store data or other information as the method performs its task(s). The local variables preferably are specific to the method to which the variables pertain. That is, method A's local variables ("LVA") are accessible generally by only method A and have meaning only to method A. Once method A completes, the method A local variables become meaningless. Similarly, LVB and LVC comprise local variables associated with methods B and C, respectively. Java Bytecodes refer to local variables using an index. The JVM maintains a local variables pointer ("PTR LV") which points to the base address of the memory containing the current method's local variables. To access a particular local variable, a suitable index value is added to the base address to obtain the address of the desired local variable. In general, the local variables associated with one method may have a different size than the local variables associated with another method.

FIG. 5 generally shows the state of the D-RAMset 126 in accordance with a time sequence of events 500, 510, and 520 as each method B and C is invoked. In sequence 500, method A is invoked and storage space 502 is allocated for its local variables (LVA). A base pointer (PTR LVA) 504 also is determined or selected to point to the base portion of LVA storage space 502. Using the pointer PTR LVA, references may be made to any local variable within method A's local variable set 502 by computing an index or offset to the PTR LVA value.

Although a plurality of methods may run on the JSM 102, typically only one method is "active" at a time having its instructions actively being executed by the JSM 102. The base pointer of the currently active method preferably is stored in register R5 as noted previously. In general, the base pointer for the active method may be computed by the JVM 108 while executing the invoke bytecode of the active method.

Sequence 510 depicts the state of the D-RAMset 126 when method A calls method B. In accordance with the preferred embodiments of the invention, the local variables (LVB) associated with method B are stacked in storage space 512 generally adjacent LVA ("on top of" LVA when viewed as in FIG. 5). Following arrow 505, the base pointer for LVA (PTR LVA) preferably is also stored in the D-RAMset 126 adjacent (e.g., below) the LVB data at location 504A. Thus, the two local variable sets LVA and LVB may be separated by the base pointer (PTR LVA) for LVA and possibly other data. Once the base pointer 504 for LVA is stored adjacent (below) the reserved space for the LVB data set 502, register R5 is updated (i.e., loaded) with a base pointer 514 for use with the LVB data set.

Following arrow 507 to time sequence 520, when method C is invoked (called by method B), the base pointer for method B (PTR LVB) is stored in location 514A which may be on top of LVB and below PTR LVC as shown and register R5 is loaded with the base pointer 524 (PTR LVC) to the base of the LVC data set 522. Method C's local variables (LVC) are allocated to storage space 522 which generally is adjacent (on top of) LVB 512 and PTR LVB 514A as shown. The PTR LVB value is stored in location 514A according to a similar calculation as that described above.

Figure 6:
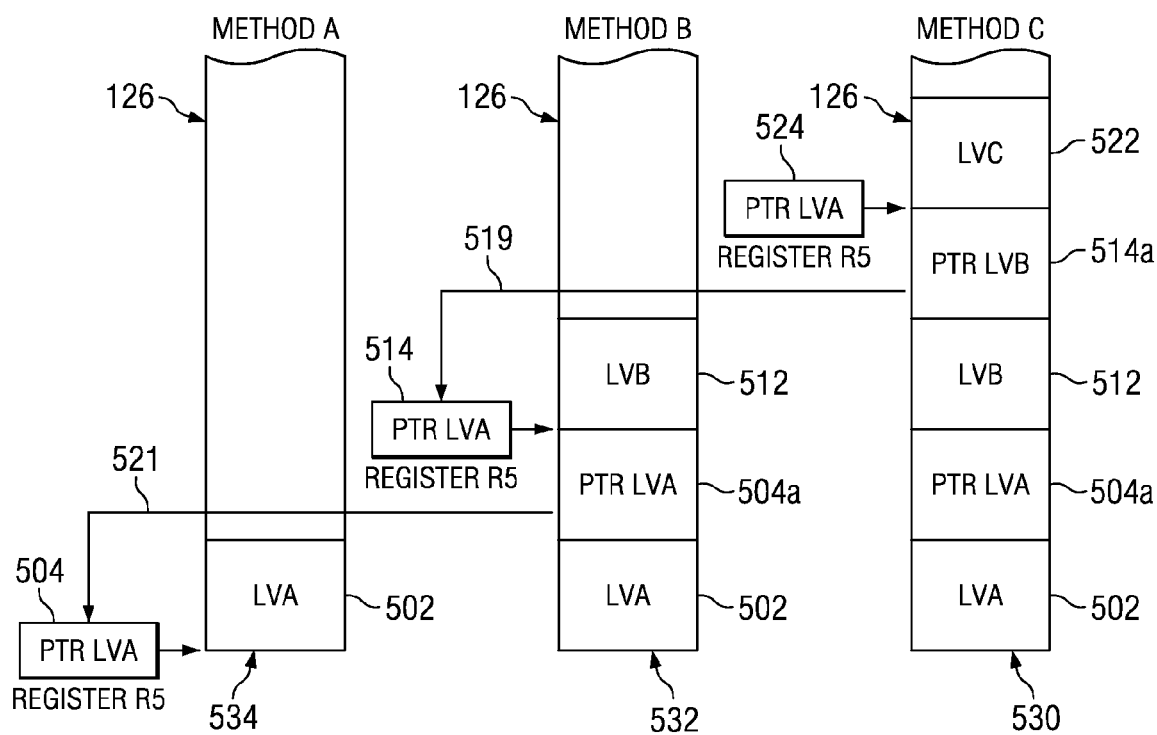
FIG. 6 illustrates the use of the local variable pointers upon returning from a method.

FIG. 6 illustrates the return process as each method (Methods C and then B) completes and returns to its calling method (methods B and then A). Beginning with time sequence 530 in which the local variable frame comprises LVA, LVB, and LVC along with pointers PTR LVA and PTR LVB for LVA and LVB, method C completes. Control returns to method B and LVB's base pointer is loaded from location 514A into register R5 as shown by arrow 519 at time sequence 532 by accessing PTR LVB through a load instruction that include a fixed offset from PTR LVC as a target address. Then, when method B completes, LVA's pointer (PTR LVA) is loaded into register R5 from location 504A as illustrated by arrow 521 at time sequence 534. The base pointers may be retrieved from their locations in data cache 126 by loading the value located at the location pointed by the currently active method's base pointer minus an offset (e.g., 1).

In accordance with preferred embodiments of the invention, the D-RAMset 126 is configured to provide any one or more or all of the following properties. The implementation of the D-RAMset 126 to provide these properties is explained in detail below. The local variables and pointers stored in the D-RAMset 126 preferably are "locked" in place meaning that, although the D-RAMset 126 is implemented as cache memory, eviction of the local variables generally can be prevented in a controlled manner. The locking nature of the D-RAMset 126 may be beneficial while a method executes to ensure that no cache miss penalty is incurred. Additionally, write back of valid, dirty local variables to main memory 106 is avoided in at least some situations (specified below). Further, mechanisms can be employed in the event that the D-RAMset 126 has insufficient capacity to accommodate all desired local variables. Further still, once a method has completed, the portion of the D-RAMset allocated for the completed method's local variables remains marked as "valid." In this way, if and when such methods or any new methods are executed and re-use the RAMset space (such as that described in one or more of the copending applications mentioned above), such methods' associated local variables will be mapped to the same portion of the D-RAMset. If the RAMset lines are already marked as valid, access to those new local variables may not generate any misses. Retrieval of data from memory in this situation is unnecessary because the local variables only have significance while a method executes and a newly executing method first initializes all of its local variables before using them. Not generating misses and thus avoiding fetching lines from external memory reduces latency and power consumption. After a relatively short period of time following the start of a Java program execution, all relevant lines of the RAMset are marked as valid and accesses to local variables of newly called methods do not generate misses, thereby providing superior performance of a "0-wait state memory." Furthermore, the cache properties of RAMset allow discarding or saving of the data in main memory whenever required.

In accordance with a preferred embodiment of the invention, the local variables (LVA-LVC) and associated pointers (PTR LVA-PTR LVC) may be stored in D-RAMset 126. The D-RAMset 126 may be implemented in accordance with the preferred embodiment described below and in copending applications entitled "Cache with multiple fill modes," filed Jun. 9, 2000, Ser. No. 09/591,656; "Smart cache," filed Jun. 9, 2000, Ser. No. 09/591,537; and publication no. 2002/0065990, all of which are incorporated herein by reference.

As described in greater detail below, in the preferred embodiment, the data storage 122 (FIG. 3) preferably comprises a 3-way cache with at least one cache way comprising D-RAMset 126. The D-RAMset ("RAMset") cache 126 may be used to cache a contiguous block of memory (e.g., local variables and pointers as described above) starting from a main memory address location. The other two cache ways 124 may be configured as RAMset cache memories, or use another architecture as desired. For example, the data storage 122 may be configured as one RAMset cache 126 and a 2-way set associative cache 124. As such, the data storage 122 generally comprises one or more forms of cache memory. The instruction storage 130 may be similarly configured if desired.

In operation, the processor's core 102 may access main memory 106 (FIG. 1) within a given address space. If the information at a requested address in main memory 106 is also stored in the data storage 122, the data is retrieved from the data cache 124, 126. If the requested information is not stored in data cache, the data may be retrieved from the main memory 106 and the data cache 124, 126 may be updated with the retrieved data.

Figure 7:
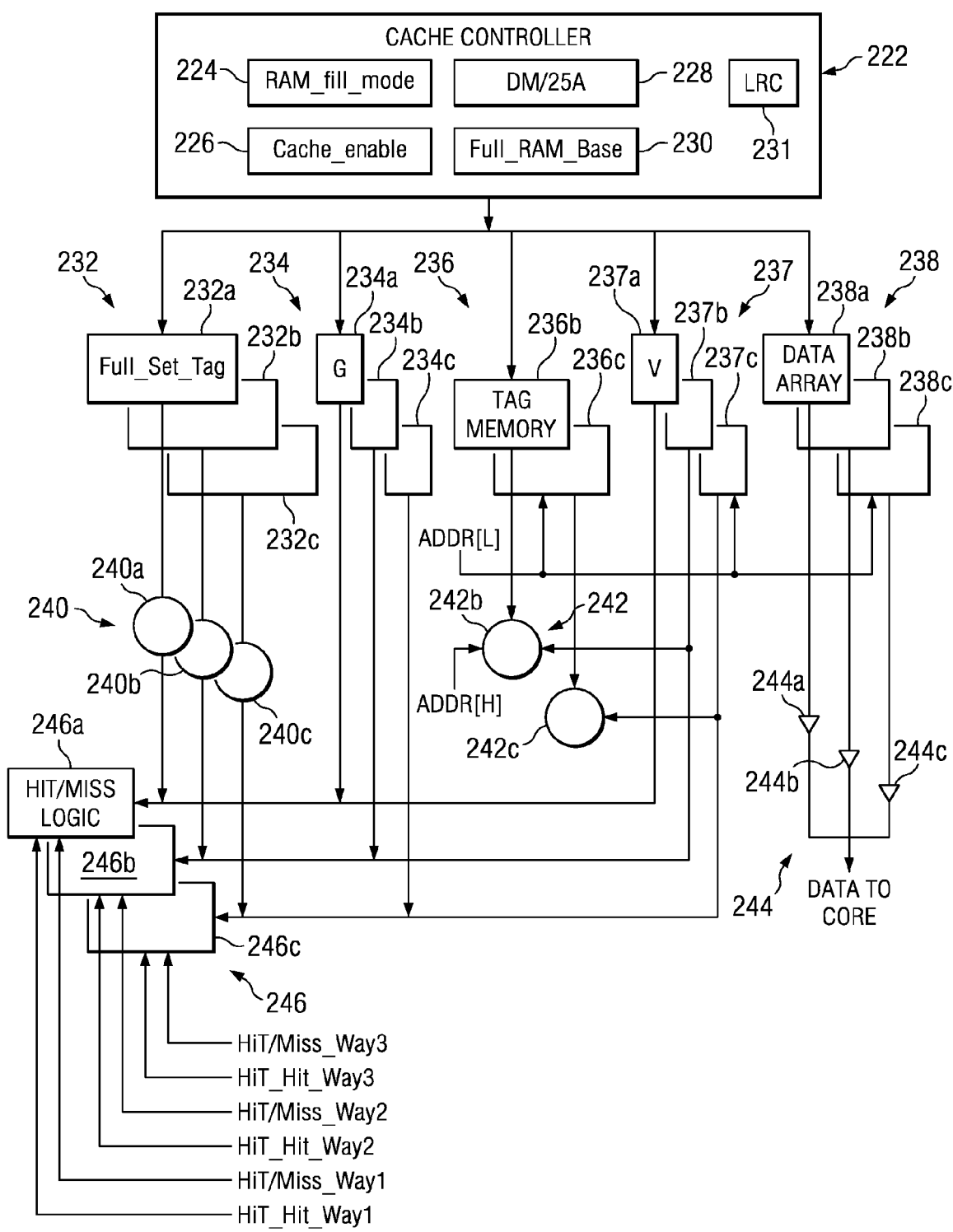
FIG. 7 illustrates a preferred embodiment of cache-based data storage (including a "RAMset") in the JSM of FIG. 3.

FIG. 7 illustrates a more detailed block diagram of the data storage 122 in accordance with a preferred embodiment with a RAMset cache and a two-way set associative cache. A cache controller 222 may control operation of the data storage 122. The controller 222 may be communicatively coupled to the data storage 122 and to other components such as the communications transceiver noted above. Cache controller 222 may include a plurality of status bits including, without limitation, the following four status bits: RAM_fill_mode 224, Cache_Enable 226, DM/2SA 228 and Full_RAM_base 230 and local RAM/cache ("LR/C") 231, as well as other bits that are not specifically shown in FIG. 7. The two-way associative cache may be configured as a direct map and its other way configured as a RAMset. Alternatively, the two-way set associative cache may be configured as two additional RAMsets depending on cache control bit DM/2SA 238 and FULL_RAM_Set_base 230 as described in at least one of the documents incorporated herein by reference. However, the preferred configuration comprises a single RAMset coupled to a standard data cache. The RAMset is not limited in size, nor must the RAMset have the same size as the other cache way. Therefore, if another RAMset is needed for capacity reasons, a single RAMset with a larger capacity may be preferred.

As shown, cache controller 222 couples to, or otherwise acceses, Full_Set_Tag registers 232 (individually referenced as registers 232a through 232c), Global_Valid bits 234 (individually referenced as bits 234a through 234c), tag memories 236 (individually referenced as tag memories 236b and 236c), valid entry bit arrays 237 (individually referenced as bit arrays 237a through 237c) and data arrays 238 (individually referenced as data arrays 238a through 238c). Comparators 240 (individually referenced as comparators 240a through 240c) may couple to respective Full_Set-Tag registers 232. Comparators 242 (individually referenced as comparators 242b and 242c) couple to respective tag memories 236. Output buffers 244 (individually referenced as buffers 244a through 244c) may couple to respective data arrays 238. Hit/Miss logic 246 (individually referenced as logic 246a through 246c) may couple to comparators 240, global valid bits 234, valid bits 237, RAM_fill_mode bit 224 and Cache_Enable bit 226.

In operation, data storage 122 may be configured using the control bits 224, 226, 228 and 230. The Cache_Enable 226 allows the data storage to be enabled or disabled, as in standard cache architecture. If the data storage 122 is disabled (e.g., Cache Enable=0), data read accesses may be performed on the main memory 106 without using the data storage 122. If the data storage 122 is enabled (e.g., Cache_Enable=1), data may be accessed in the data storage 122, in cases where such data is present in the data storage. If a miss occurs, a line (e.g., 16 bytes) may be fetched from main memory 106 and provided to the core 120.

The size of the data array 238a may be different than the size of the data arrays 238b, c for the other ways of the cache. For illustration purposes and without limiting this disclosure in any way, it will be assumed that data arrays 238b and 238c are each 8 Kbytes in size, configured as 512 lines, with each line holding eight two-byte data values. Data array 238a may be 16 Kbytes in size, configured as 1024 lines, each line holding eight, two byte data values. The ADDR[L] signals may be used to address one line of the data array 238 and valid bit array 237 (and tag memory 236, where applicable). Accordingly, for the 1024-line first way, ADDR[L] may include 10 bits [13:4] of an address from the core. For the 512-line second and third ways, ADDR[L] may include 9 bits [12:4] of an address from the core. The ADDR[H] signals define which set is mapped to a line. Thus, assuming a 4 Gbyte address space, ADDR[H] uses bits [31:14] of an address from the core for the first way and uses bits [31:13] for each of the second and third ways of the cache 130.

The tag memories 236 and comparators 242 may be used for a two-way set associative cache (e.g., D-cache 124 in FIG. 3). When the core 120 performs a memory access, the tag memories 236 are accessed at the low order bits of the address (ADDR[L]). The tag memory locations store the high order address bits of the main memory address of the information stored in a corresponding line of the data array 238. These high order address bits may be compared with the high order address bits (ADDR[H]) of the address from the core 120. If the ADDR[H] matches the contents of the tag memory at ADDR[L], a hit occurs if the valid bit associated with the low order bits indicates that the cache entry is valid. If a cache hit occurs, the data from the corresponding data array 238 at ADDR[L] may be provided to the core 120 by enabling the corresponding output buffer 244. As described below, data from the two-way cache is presented to the core 120 if there is a miss in the RAMset cache. By itself, the operation of the two-way set associative cache and the direct map cache may be conventional and may not be affected by the RAMset cache 126. Other cache techniques could also be used in place of the two-way cache 124.

The RAMset cache 126 preferably stores data associated with a contiguous block of main memory 106 starting at an address defined by the Full_set_tag register 232 for the RAMset. This contiguous block of information (e.g., local variables/pointers) may be mapped to the corresponding data array 238 of the RAMset. In at least some embodiments, only the high order bits of the starting address are stored in the Full_set_tag register 232. FIG. 8 illustrates this mapping for a single RAMset. As shown, the contents of Full_set_tag register 232a define the starting address for a contiguous block of memory cached in data array 238a.

Referring again to FIG. 7, a RAMset miss may occur when the high order bits of the address from the core 120 do not match the contents of the Full_set_TAG register 232 or the global valid bit is "0". In either case, when a RAMset miss occurs, the data storage 122 may behave like conventional, two-way cache logic. As such, if there is a hit in the two-way associative cache, then data is presented to the core 120 from the two-way set associative cache. Otherwise, the data is retrieved from main memory 106, forwarded to the core and loaded into a "victim" entry of the two-way associative cache.

A RAMset hit situation may occur when the high order bits of the address from the core 120 match the contents of the Full_set_TAG register 232 and the global valid bit equals "1" (the setting of the global valid bit is described in greater detail below). By default, the RAMset comparison preferably has higher priority than the other cache ways. A hit situation indicates that the requested data is mapped into the RAMset. If the Valid entry bit 237 corresponding to the line containing the data is set to "1", comparator 240 causes hit/miss logic 246 to generate a "hit-hit" signal because the address hit the RAMset and the data is present in the RAMset. If the corresponding valid bit 237 of the RAMset entry is "0", logic 240 generates a "hit-miss" because the address hit the RAM set, but the data is not yet present in the RAM set. In this latter case, the data may be fetched from main memory 106 and loaded into the data array 238 of the RAMset. A hit in the RAMset logic preferably takes precedence over the normal cache logic. The standard logic of the two-way cache generates a miss when the RAMset logic generates a hit. Information can reside in both the RAMset and the two-way cache without causing any misbehavior; the duplicated cache entry in the 2-way cache will eventually be evicted by the replacement mechanism of the two-way cache because such data will not be used. However, in the preferred embodiment the data mapped onto a RAMset is first removed from the cache to avoid a data coherency problem. When configured as a RAMset, data array 238a, b, c can be configured as a local RAM or as a cached segment depending on the setting of a suitable configuration bit (e.g., LR/C bit 231). However, even when configured as a local RAM, individual valid bits may be updated but misses do not generate accesses to the external memory.

To configure a RAMset for operation, the Full_set_tag register 232 preferably is loaded with a start address (set_start_addr) and the RAM_fill_mode bit 224 is configured to a desired fill mode. The circuitry for filling the cache can be the same as that used to fill lines of the set associative cache. At least one fill mode may be implemented and is referred to as a "line-by-line" fill mode as described below. Other fill modes may be implemented if desired such as the "set fill" mode described in at least one of the documents incorporated by reference.

For the line-by-line fill (RAM_fill_mode=0), the global valid bit 34 is set to "1" and each of the valid entry bits 237 is set to "0" when the Full_set_tag register 232 is loaded with the starting address. At this point, the data array 238 is empty (it is assumed that the Cache_Enable bit 226 is set to "1" to allow operation of the data storage 122). Upon receiving an address from the core 120, a valid entry bit 237 is selected based on the low order bits of the address. As provided above, if the RAMset is 16 Kbytes in size, organized as an array of 1 K×16 bytes, where 16 bytes is equivalent to a block line in the associated 2-way cache, the Full_set_TAG register 232 may store 18 bits [31:14] of the starting address. The address indexing each entry of the RAMset (ADDR[L]) may include 10 bits [13:4] while the data address used to access one data value in the line may include 4 bits [3:0] (assuming data accesses are 1 byte). In Java, local variables comprise four byte entities but, as explained previously, the RAMset may be shared between local variables and other, possibly critical, data. A line of the data array 238 (at ADDR[L]) is loaded from main memory 106 each time that a miss situation occurs because the comparator 240 determines a match between ADDR[H] and the content of Full_set_TAG, the Global valid bit 34 is set to "1" and the valid bit 237 associated with the line at ADDR[L] is "0". The state of the RAMset in this mode of operation is also referred to as the cache policy "CP" state. This situation indicates that the selected line is mapped to the RAMset, but has not yet been loaded into the RAMset's data array 238. When the line is loaded into the data array 238 from main memory 106, the valid bit 237 corresponding to the line is set to "1".

This loading procedure (resulting in the valid bit being set to indicate the presence of valid data) has the same time penalty as a normal cache line load, but the entry will remain locked in the RAMset (i.e., the valid bit will remain set) unless the content of the Full_Set_Tag is changed and, therefore, the processing device will not be penalized on a subsequent access. As such, the lines used by a completed method remain valid so that re-using the lines by subsequent methods does not necessitate accesses to main memory 106. Further, freeing the local variable space for a completed method generally only involves disregarding the relevant base pointer. Further still, there is no need to copy back local variables upon to main memory 106 upon completion of a method because such extinct local variables are not used any more.

In some situations, the capacity of the D-RAMset 126 may not be sufficient to hold all desired local variables. In accordance with at least one embodiment, excess local variables may be stored in the non-D-RAMset data arrays 238. In accordance with other embodiments, a larger block of local variables (i.e., larger than just the excess local variables) may be mapped to the non-D-RAMset cache ways. During the "invoke" bytecodes, that initiates a method call, the local variable size of the called method is known by the JVM 108. The JVM also knows the total RAMset size (via a readable configuration register) and the RAMset size already utilized. Therefore, based on this information, the JVM may or may not decide to map the new local variable area onto the RAMset. A method may have a large chunk of local variables and not use them on each call. Therefore, mapping those local variables onto the RAMset may force unnecessary RAMset management of the base pointer and saving/restoring of local variables of calling methods or may cause more frequent overflow of a subsequently called method. Instead, the JVM 108 may map the methods with larger chunks of local variables onto the non-RAMset data cache and thus preserve more space in the RAMset for methods with a smaller number of local variables. In some embodiments, many methods may have less than 10 local variables and almost all methods have less than about 40 local variables, but, of course, these numerical characterizations are application dependent. For methods with many local variables, the system may map those local variables outside the RAMset avoiding penalizing other methods. This technique is generally transparent for the return mechanism because of the management of the PTR_LV of the calling method. Upon completion of a method, the lines containing that method's local variables may remain marked as valid. As noted above, maintaining such lines marked as valid avoids generating misses in calls of new methods.

Figure 9:
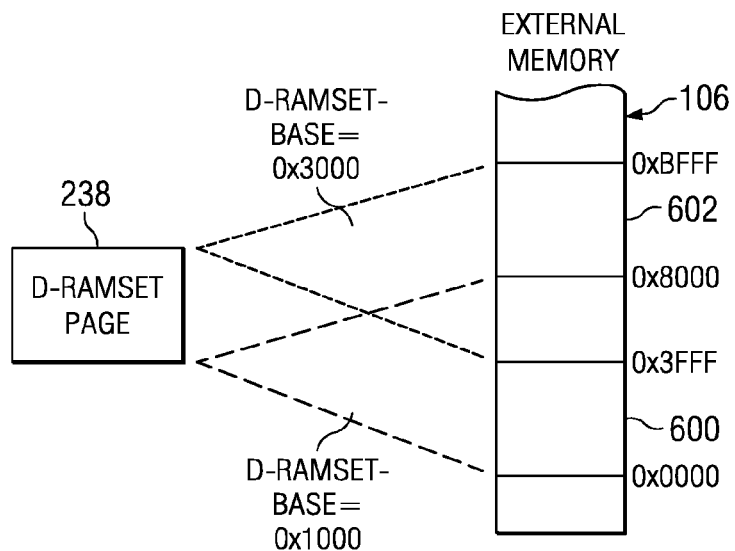
FIG. 9 illustrates another mapping of a contiguous block of main memory onto a RAMset.

In accordance with some embodiments, more than one contiguous block of external memory 106 may be mapped onto the D-RAMset's data array 238. As illustrated in FIG. 9, for example, two contiguous blocks 600 and 602 of external memory 106 may be mapped onto the D-RAMset 126. Block 600 comprises 16K of contiguous bytes from the address range of 0x0000 to 0x3FFF. Similarly, block 602 comprises 16K of contiguous bytes from the address range of 0x8000 to 0xBFFF. One block 600, 602 at a time may be mapped onto the D-RAMset 126 by reprogramming the D-RAMset's Full_set_tag register 232 as explained previously.

A plurality of commands may be implemented in connection with the data storage 122. Such commands may include, without limitation, D-RAMset-Clean, D-RAMset-Flush, and D-RAMset-policy-set. In addition to valid bits 237 for each line, a dirty bit also may be provided to indicate whether or not the line contains dirty data. The D-RAMset-Clean command may be performed by examining the valid and dirty bits associated with each line. The D-RAMset-Clean command then copies back to external memory 106 only those lines that have valid and dirty data. In embodiments without dirty bits, the D_RAMset-Clean preferably copies all valid entries from D_RAMset 126 to external memory 106. The D-RAMset-Flush command invalidates lines within the D-RAMset 126 by clearing the relevant valid bits 237. The D-RAMset-Clean and D-RAMset-Flush commands may be performed in one of at least three variations. In one variation, the D-RAMset-Clean and D-RAMset-Flush commands perform their respective actions on all of the lines of the D-RAMset 126 (D-RAMset-CleanAll and D-RAMset-FlushAll). In another variation, the D-RAMset-Clean and D-RAMset-Flush commands perform their respective actions on just those lines in the D-RAMset 126 that fall within a range of addresses specified as operands in the commands (D-RAMset-CleanRange and D-RAMset-FlushRange). A third variation permits the D-RAMset-Clean and D-RAMset-Flush commands to act on a single address within the D-RAMset 126 (D-RAMset-CleanEntry and D-RAMset-FlushEntry) providing the corresponding data address to be saved or invalidated.

One or more commands are used to specify whether a data array 238 configured as a RAMset is to function as a Local RAM or as cache. The D-RAMset-policy-set command is used in this regard. In the embodiments described below, this command is implemented as two separate commands called the SPP command and the CP command. Such commands may set one or bits in a register to indicate how a data array 238 is to be used. The bit that is set may comprise a bit in the status register R15, the LR/C bit 231 in a register in the cache controller 222 (FIG. 7), or in another control register (not specifically shown) in the JSM 102. Once the bit is set to specify the desired behavior of the associated data array, the cache controller 222 reads the state of the bit to determine the desired allocation policy to implement. The bit may be set, for example, to specify a Local RAM behavior referred to as the scratchpad policy ("SPP") effectuated by the SPP command. In that mode, fetches from external memory are eliminated on cache misses as explained above. Alternatively, the bit may be set so as to specify a cache-based allocation policy in which fetches from external memory are performed on misses before accessing the target data. This latter policy is referred to as the cache policy ("CP") and is effectuated by the CP command. The execution of the SPP and CP commands may be performed dynamically during run-time.

Figure 10:
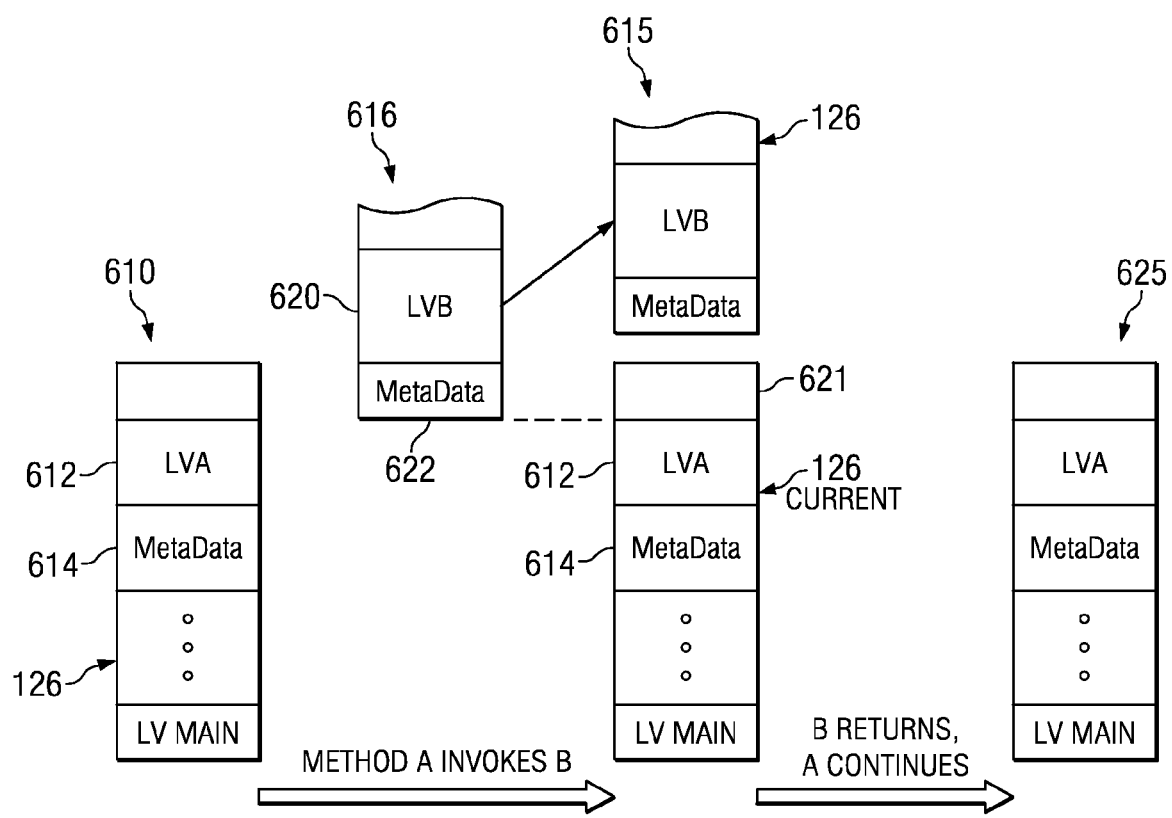

FIG. 10 illustrates an overflow condition. At 610, the D-RAMset 126 may comprise local variables 612 associated with a method A and associated metadata 614. The metadata 614 may comprise various runtime dependent data and local variable pointers as described previously. At 615, method A invokes method B. In this example, the size of method B's local variables 620 and metadata 622 in memory block 616 is greater than the amount of memory 621 available for allocation to local variables in the current D-RAMset which is identified as $126_{current}$. In accordance with some embodiments of the invention, method B's local variables and metadata may be mapped to the two-way set associative cache as explained previously. In accordance with other embodiments, a new memory page may be allocated and mapped onto the D-RAMset 126 such as that depicted in FIG. 9. Remapping the D-RAMset 126 may include saving off one or more local variables and metadata from the RAMset's current data. Writing such RAMset data to memory is performed by an operation called a "clean" operation. At any rate, at 625 when method B completes and returns, the JVM 108 preferably re-maps the D-RAMset with method A's local variables and metadata.

Referring now to FIG. 11, an overflow condition may be handled as follows and may also be applicable upon a context switch. At 650, before switching to a new memory page, all local variables and associated metadata from the unfinished method(s) present in the D-RAMset 126 preferably are copied to external memory 106 preferably using the D-RAMset-CleanRange command. As explained above, this command comprises the D-RAMset-Clean command and operands that specify a range of addresses to clean (copy back to external memory 106). The range of addresses to be cleaned include those addresses from the base address stored in the Full_set_tag register 232 to an address corresponding to the sum of the local variable pointer (PTR LV) 651 and a value 653 that corresponds to the size of the current local variable space. Alternatively, the D-RAMset-CleanAll command could be used to clean the entire D-RAMset. Further still, one or more repetitions of the D-RAMset-CleanEntry command may be performed to clean the desired range. At 652, a new page preferably is allocated to the D-RAMset 126. The previous value of the Full_set_tag register 232 is saved in the new metadata stored in the D-RAMset and the Full_set_tag register 232 is reprogrammed with a new page base address.

FIG. 12 illustrates an underflow condition and may also be applicable upon a context switch. A return from a method may prompt a D-RAMset change to a different page (e.g., a page previously mapped to the RAMset 126). In general, management of the reloading of the D-RAMset preferably comprises fetching values from external memory 106 only on the first access of each relevant line. As described herein, the JSM 102 includes the ability to dynamically set the load policy. In accordance with preferred embodiments of the invention, this reloading of the D-RAMset underflow situation may be handled as follows. At 660, the previous value of the D-RAMset base (described above as being stored in metadata from the Full_set_tag register 232) is retrieved from the D-RAMset's metadata and reloaded into the Full_set_tag register 232. At 662, before restoring the previously saved local variable and metadata values, the data in the D-RAMset 126 preferably is invalidated by the D-RAMset-FlushAll command (invalidates the entire D-RAMset). Finally, the D-RAMset allocation policy is configured to the cache policy by the CP command to permit fetches to occur from external memory 106 the first time an access to a particular line is made.

With the structure described above, less than desirable behavior can occur in a particular situation. The situation is when the RAMset is full and a clean operation is performed to write its data to the associated page of memory to make room for additional local variables in the RAMset. The cleaning process takes time and consumes power. A new method is invoked and then uses the newly mapped RAMset for its local variables. Returning from this method to the prior method entails flushing the RAMset and bringing the previously saved local variable data back into the RAMset from memory. This flushing and retrieval from memory process also takes time and consumes power. There can be situations in which the RAMset is cleaned to make room for new data, the RAMset is used for the new data, but returns back to the prior set local variables (saved to memory) relatively quickly. In fact, one can imagine a loop in the executable code in which a method invokes a new method each time through the loop. This repeated invocation of the new method may entail a clean operation and the exit from the new method back to the calling method will a corresponding flush and memory retrieval of the calling method's data. This repeated invocation of a called method and return back to the calling method (an "oscillation") at the boundary of the RAMset space (thereby forcing a clean, flush, etc.) can consume considerable power and time just cleaning the RAMset and then flushing and bringing the data back into the RAMset. The following embodiment solves this problem.

Figure 13:
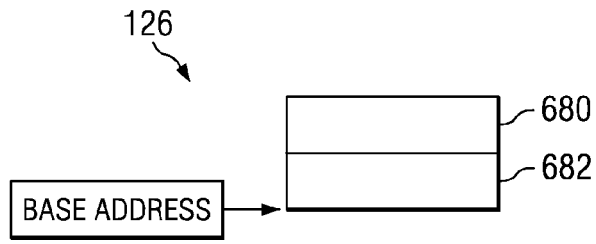
FIG. 13 illustrates a RAMset split into two portions in accordance with a preferred embodiment of the invention;_
Figure 14:
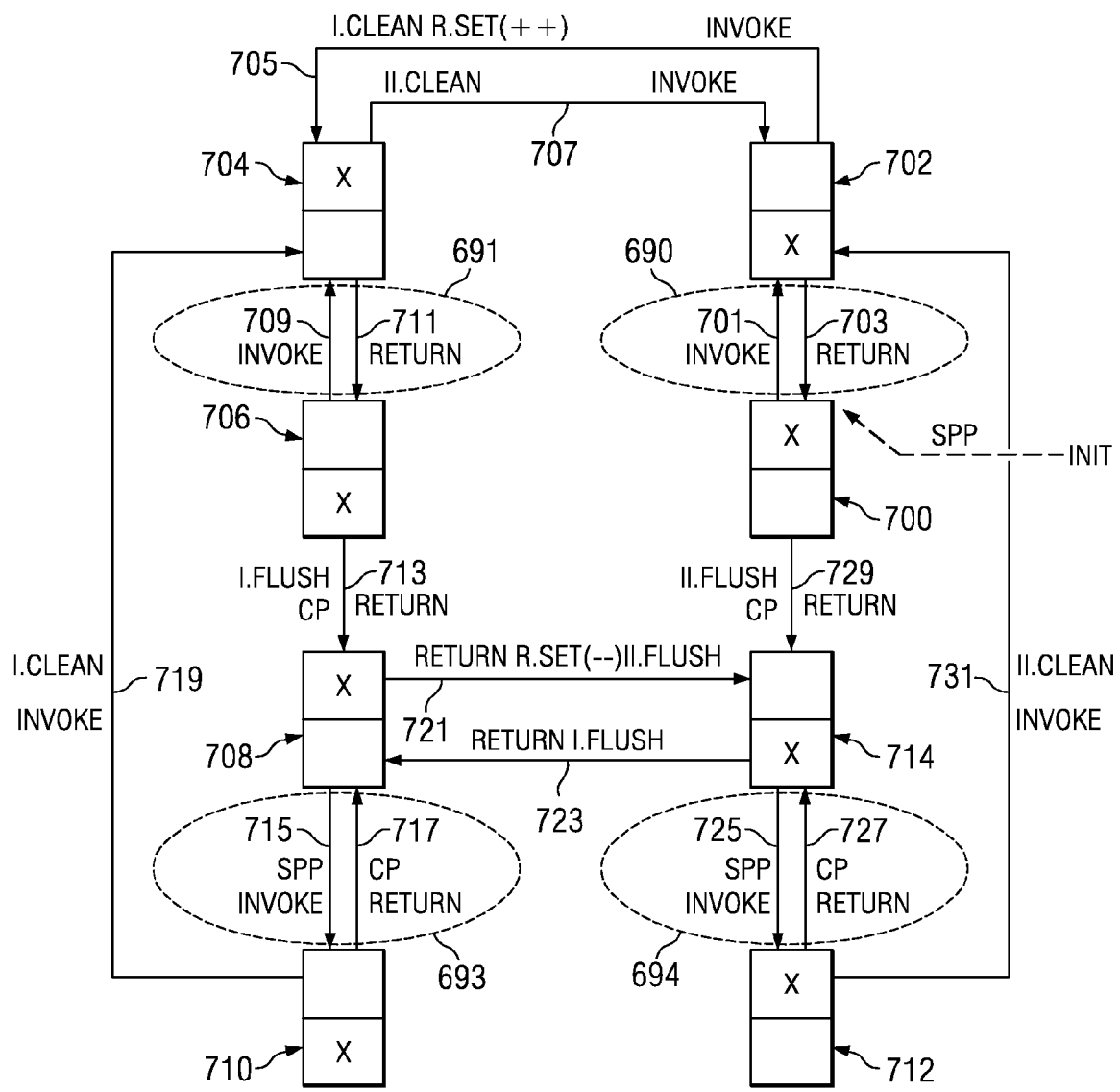
FIG. 14 shows various states and the transitions between states of the RAMset in accordance with embodiments of the invention.

In accordance with a preferred embodiment, FIG. 13 shows the RAMset 126 divided into two portions 680 and 682. In some embodiments, the two portions may each represent one-half of the size of the RAMset, but in other embodiments the division between the two portions need not be equal. For purposes of this disclosure, the portion 680 is referred to as the "upper" portion (also referred to as portion "I") of the RAMset and portion 682 is the "lower" portion (portion "II"). Data (e.g., Java local variables) can be stored in either or both portions 680 and 682. In accordance with the preferred embodiment, preferably only one portion at a time is actively used by the cache subsystem to store or retrieve data. The non-active portion may include valid data, or not, but, while inactive, is not used to store new data or provide data contained therein. The upper portion 680 can be the active portion at a given point in time, while lower portion 682 is thus inactive. Later, the lower portion 682 can become the active portion while the upper portion becomes active. Which portion is active can thus switch back and forth in accordance with the preferred embodiments and as illustrated in FIG. 14 and discussed below.

The embodiment of the RAMset in multiple portions uses the commands listed in Table I.

TABLE I

COMMANDS

| | Command | Description |
|---|---|---|
| 1 | SPP | Switch RAMset to scratch pad policy |
| 2 | CP | Switch RAMset to cache policy |
| 3 | UPPER CLEAN ("I.Clean") | Clean upper portion of RAMset to memory |
| 4 | LOWER CLEAN ("II.Clean") | Clean lower portion of RAMset to memory |
| 5 | UPPER FLUSH ("I.Flush") | Invalidate upper portion |
| 6 | LOWER FLUSH ("II.Flush") | Invalidate lower portion |
| 7 | R.SET(++) | Allocate new memory page and set RAMset base address accordingly in Full_Set_Tag register |
| 8 | R.SET(--) | Free current memory page and restore RAMset base address to previous base address in Full_Set_Tag register |

The SPP and CP commands cause the RAMset to be in the SPP and CP modes as discussed previously. The UPPER CLEAN and LOWER CLEAN commands (also called I.Clean and II.Clean, respectively) can be implemented using the D-RAMset-CleanRange and D-RAMset-CleanEntry commands to clean just the upper or lower portions, respectively. Similarly, the UPPER FLUSH and LOWER FLUSH commands (also called I.Flush and II.Flush, respectively) can be implemented using the D-RAMset-FlushRange and D-RAMset-FlushEntry commands to flush just the upper or lower portions, respectively. The R.SET(++) command causes a new page of external memory 106 to be allocated and mapped to the RAMset using the base address of the new memory page. The previous base address of the RAMset is saved as part of the data in the RAMset. The R.SET(--) command essentially performs the reverse operation of the R.SET(++) command and frees the current external memory page while restoring the base address of the RAMset to the previous base address.

FIG. 14 shows eight states of the RAMset. The eight states are identified with reference numerals 700, 702, 704, 706, 708, 710, 712, and 714. Each state of the RAMset shown illustrates the upper and lower portions discussed above with respect to FIG. 13. An "X" in one of the RAMset portions indicate that that particular portion is the active portion.

The RAMset may initialize into state 700. In state 700, the RAMset is in the SPP mode to permit the upper portion to be used to store data (e.g. local variables) but to avoid accesses to external memory 106 upon a cache miss. As explained above, a JAVA method typically requires an allocation of a portion of the RAMset for use for its local variables. Further, one method may invoke another method which, in turn, may invoke another method, and so on. Each such invoked method requires a new allocation of storage space in the RAMset. In state 700, each such allocation falls within the upper portion which is the active portion.

At some point, however, an invocation of a new method may require an allocation of RAMset storage that may exceed the available unused capacity of the upper portion. At this point, the lower portion of the RAMset needs to be used to store additional local variables for the newly invoked method. The invocation of this new method is identified by arrow 701 which points to RAMset state 702.

In RAMset state 702 (which is also in operated in the SPP mode), the lower portion of the RAMset is now the active portion. The lower portion therefore can be used to store local variables for the newly invoked method and any additional methods that are invoked therefrom. As explained above, each called method returns to its calling method. As such, the method that was invoked that caused the transition from the upper portion being active to the lower portion of the RAMset being active may eventually return to the calling method. The return to such method is illustrated with arrow 703. Further, an oscillation may occur between such methods—the method that invoked a method causing the transition to the lower portion as well as the transition back from such method. This type of oscillation (identified by oppositely pointing arrows 701 and 703 in dashed circle 690), however, is not as problematic as the oscillations noted above because the oscillation identified by arrows 701 and 703 do not require cleaning, flushing, or re-loading the RAMset. That is, no memory access is required to oscillate between the two RAMset states 700 and 702. Because no memory accesses are required, such oscillations advantageously take less time and consume less power.

However, as more and more methods are invoked requiring allocations of the lower portion of the RAMset while in state 702, eventually, the entire RAMset (i.e. both portions) may become full of valid data. At this point, any new method that is invoked will require an allocation of RAMset space greater than the available space to be allocated in the RAMset. Consequently, a portion of the RAMset is cleaned (i.e. copied to external memory 106) to make room for new data. This cleaning process is illustrated by arrow 705 which points to RAMset state 704. In particular, the clean operation only cleans the upper portion of the RAMset. The data in the upper portion represents the oldest data in the RAMset and is copied to the corresponding page of external memory. The R.set(++) command is also performed at this time to allocate a new external memory page to the RAMset.

At state 704 the upper portion of the RAMset can again be used to store new local variables for newly invoked methods. The upper portion therefore becomes the active portion of the RAMset. At this point, the upper portion of the RAMset is the active portion, the lower portion of the RAMset contains valid data but is not currently used as the active portion, and the initial data in the upper portion from state 700 (or other data from states 706 or 710) has been copied to external memory.

If insufficient space in the upper portion is available for the local variables of additional methods to be invoked, the lower portion of the RAMset can then be used for such additional local variables. In state 704, however, the lower portion of the RAMset may already have valid local variables and thus a clean operation (II.CLEAN command) is performed to first clean the lower portion so that the lower portion can be used for additional local variables. This process is depicted via arrow 707 which points back to state 702.

While at state 704 (also in SPP mode), new methods can be invoked and allocations of storage space in the upper portion of the RAMset can be performed for usage by such new methods. Of course, called methods may return back to their previous calling methods and eventually, the method that caused the first allocation of the upper portion at state 704 may return back to its calling method. That return is illustrated by arrow 711, which points to RAMset state 706 (also in SPP mode). At RAMset state 706, therefore, the lower portion of the RAMset again becomes the active portion. From the lower portion in state 706, a method may be invoked which again exceeds the available capacity of the lower portion thereby causing the upper portion to become the active portion as identified by arrow 709 which transitions back to state 704. Again, an oscillation can occur between states 704 and 706 (identified by oppositely pointing arrows 709 and 711 in dashed circle 691), but such oscillations do not require any memory accesses and therefore can be performed with little time and little power consumption.

From state 706, with the bottom portion being active, if a return is to be performed to a prior method whose local variables were stored in the upper portion of the RAMset and such data has been copied to external memory 106 (in a prior clean operation of the upper portion), the RAMset transitions to state 708 by way of return arrow 713. Because the data associated with upper portion of the RAMset has been saved off to external memory, a flush of the upper portion is performed to invalidate the upper portion. Further, the upper portion of the RAMset, now the active is transitioned to the CP mode to permit the previously saved data to be loaded into the RAMset's upper portion.

From state 708, if a return is performed to a prior method whose local variables are associated with the lower portion of the RAMset but have been saved off to external memory, the RAMset operates according to state 714 still in the CP mode (arrow 721). A R.SET(−−) command is performed to free the current memory page and restore the RAMset base address to the previous base address. Also, a flush of the bottom portion if performed to cause the bottom portion's data to be retrieved from external memory.

Going back to state 708, if RAMset storage space is needed for a new method and the extra storage is not available in the currently active upper portion, the RAMset operates according to state 710. In state 710, the RAMset operates in the SPP mode and the bottom portion becomes the active portion for storing local variables. This invocation is illustrated by arrow 715. A return to the method that caused the bottom portion to become active may be performed back to state 708 (arrow 717). An oscillation between states 708 and 710, designated by oppositely pointing arrows 715, 717 within dashed circle 693 do not require any external memory accesses and therefore can be performed in relatively little time and with relatively little power consumption.

From state 710, an invocation of a method that exceeds the storage capacity of the active lower portion takes the RAMset to a different state, in particular, state 704. This transition is shown by way of arrow 719 and also requires a clean of the upper portion to be performed to save the data already present in the upper portion so that the upper portion of the RAMset can be used for additional local variables.

From state 700, a return to a method whose local variables are associated with the lower portion but have been saved to external memory can now be performed with the RAMset now operating to state 714. This transition is identified by arrow 729 and a flush of the lower portion is performed along with a change in the allocation policy to the CP mode. The change to the CP mode causes previously cleaned data from external memory to be re-loaded into the corresponding lines of the lower portion of the RAMset.

An oscillation can also occur between states 712 and 714 between the lower and upper portions of the RAMset. The oscillations are indicated by oppositely pointing invocation arrow 725 and return arrow 727 within dashed circle 694. This oscillation occurs without accesses to external memory and thus requires little time and power. As with the oscillation between states 708 and 710, the oscillation between states 712 and 714 require a change in allocation policy as shown. RAMset state 712 is in the SPP mode because the needed local variable data is already in the upper portion. State 714 is in the CP mode because the needed data must be retrieved from external memory and re-loaded into the lower portion of the RAMset.

From state 712, an invocation of a method that exceeds the storage capacity of the active upper portion takes the RAMset to a different state, and in particular, state 702. This transition is shown by way of arrow 731 and also requires a clean of the lower portion to be performed to save the data already present in the lower portion so that the lower portion of the RAMset can be used for additional local variables.

Finally, from state 714 in which the lower portion is active, a method that returns to a calling method whose local variable data is stored in the upper portion causes state transition to state 708 (arrow 723). This transition makes the upper portion the active portion so that the upper portion can be used to access the local variables stored therein.

In accordance with at least one embodiment of the invention, a state variable is maintained to indicate the state of the RAMset. For example, FIG. 14 shows eight exemplary states and thus the state variable would have at least eight different values, each value corresponding to a different state. The algorithm discussed herein updates the state variable when the RAMset transitions from one state to another and, at least in part, uses the value of the RAMset state variable to determine the appropriate actions to be performed (e.g., II. Clean, R.SET(--), etc.) for each transition.

In a multi-threaded execution environment, execution of one thread can be preempted in favor of execution of another thread. Upon switching from one thread to another, the "context" of the former thread must be saved so that processor resources can be dedicated for use by the new thread. Eventually, the new thread may cease execution and a context switch back to the former thread is performed thereby restoring the former thread's context. Context refers broadly to any information unique to a particular thread. Examples of information that comprises the context of a thread include the local variables, the registers 140, the program counter (PC), etc.

The RAMset contains local variables that are specific to certain methods that execute within a given thread. If a change is to be made from one thread to another, some or all of the contents of the RAMset are saved (cleaned) to external memory 106 to save the context of the former thread. The RAMset can then be used for storing local variables associated with the new thread. Subsequently, a switch back to the former thread may be performed and that former thread's local variables will be loaded back into the RAMset. The following discussion regarding FIGS. 15 and 16 explain this process in greater detail.

Because the RAMset is divided operationally into two portions, in some situations, cleaning the entire contents of the RAMset is required, while in other situations, only one portion of the RAMset need be cleaned. FIGS. 15a-15d shows the RAMset in four exemplary states that require both portions of the RAMset to be cleaned. FIGS. 16a-16d shows the RAMset in four other exemplary states that require only one portion of the RAMset to be cleaned.

FIGS. 15a-15d and 16a-16d show the state of the RAMset at reference numeral 550 in various examples. Each figure also includes reference numerals 551 and 552. Reference numeral 551 identifies the portion of external memory to which the RAMset in state 550 is mapped. Reference numeral 552 also identifies the portion of the external memory to which the RAMset is mapped. Some of the examples of FIGS. 15-15d and 16a-16d have the RAMset mapped to two different portions of external memory. One portion is designated as 552a and the other portion is designated as 552b. The difference between memory mapped versions 551 and 552a,b of the RAMset is that the version 551 represents the state of the memory before a clean operation to implement a thread switch and version 552a,b represents the state of the memory after the clean operation.

Figure 15A:
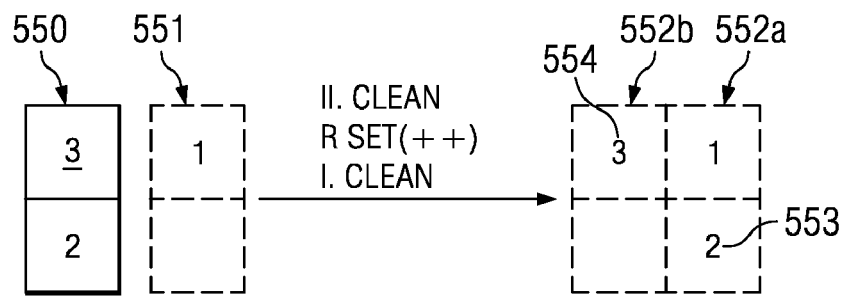
FIGS. 15a-15d show various examples of saving the contents of the RAMset to external memory upon a thread switch.

FIG. 15a shows the memory-mapped version of the RAMset as containing data in the upper portion of the RAMset. The number "1" in the memory-mapped version of the RAMset 551 depicts that data from the upper portion of the RAMset was cleaned to memory in a prior clean operation. Currently, the RAMset 550 contains data in both the upper and lower portions of the RAMset. The lower portion of the RAMset contains data labeled as "2" and the upper portion contains data designated as "3". The number 3 is underlined to indicate that the upper portion is currently the active portion of the RAMset as explained above. The numbers 1, 2, 3, etc. in the upper and lower portions of the RAMset 550 and memory mappings of the RAMset at 551 and 552 comprise reference numerals that identify the data contents of the associated portions.

At this point, a change of threads may be desired, and accordingly, the contents of the RAMset must be cleaned to memory so that the RAMset can be used for local variables associated with a new thread. In the example of FIG. 15a, three commands are performed to clean the RAMset. First, a II.clean command is performed to clean the lower portion of the RAMset to memory as shown at 553. Then, an R.Set(++) command is performed to re-map the RAMset to a different portion of memory as indicated at 552b. At this point the remaining upper portion of the RAMset is cleaned via a I.clean command thereby copying the contents of the upper portion of the RAMset (data 3) to external memory as indicated at 554.

Figure 15B:
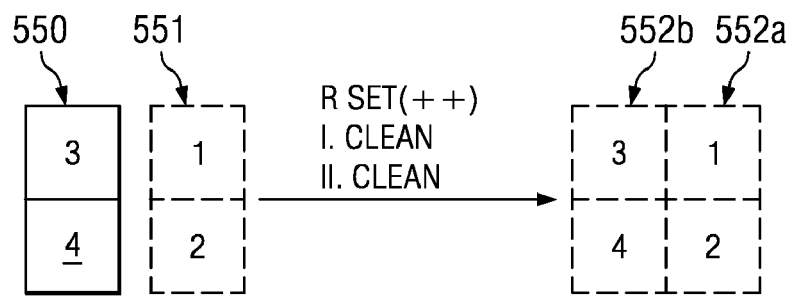

FIG. 15b illustrates a situation in which the currently mapped version of the RAMset at 551 contains valid data labeled as "1" and "2". The RAMset contains new valid data labeled as "3" and "4". Thus the RAMset is first mapped to a different portion of memory 552b via the R.set(++) command. Subsequently I.Clean and II.Clean commands are performed, the order is irrelevant, to clean the upper and lower portions of the RAMset to the newly mapped memory.

Figure 15C:
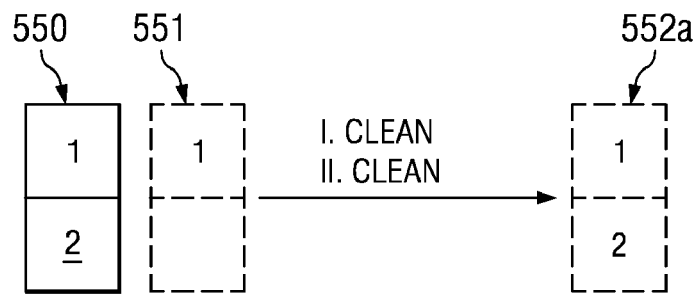

In FIG. 15c, the RAMset contains data "1" and "2" in the upper and lower portions of the RAMset, respectively. The memory-mapped version of the RAMset at 551 contains data "1" which means that the upper portion of the RAMset has previously been cleaned to memory. Thus the I.clean and II.clean commands are performed to clean the upper and lower portions of the RAMset, and the RAMset need not be re-mapped to a new portion of memory. Instead, the upper portion of the RAMset 551 containing data "1" is simply copied to and overwrites the upper portion of the memory mapped version of the RAMset. In other embodiments, the upper portion of the memory-mapped version of the RAMset is not overwritten in its entirety, and instead is updated. That is, the clean operation copies "dirty" data from the RAMset portion 551 back to memory (only the dirty data is written back to memory and overwrites the corresponding data in memory). Dirty data comprises data that has been updated with regard to t he corresponding data in memory.

Figure 15D:
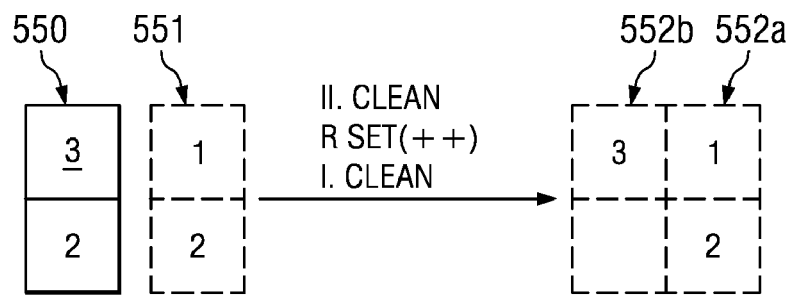

In the example of FIG. 15d, the RAMset 550 contains valid data ("1" and "2") in both portions and the memory-mapped version 551 of the RAMset before the clean contains data "1" in the upper portion and data "2" in the lower portion of memory. As can be seen, the lower portion of the RAMset and the lower of portion of the memory-mapped version of the RAMset both contain the same data "2." To clean the RAMset in this example, the lower portion is first cleaned via the II.clean command. This cleaning operation causes the data "2" in the RAMset 550 to overwrite the corresponding portion in the memory mapping 552a. Alternatively, only the dirty data within data "2" is copied back to the corresponding memory locations. Then, the RAMset is re-mapped via the R.Set(++) command to a new area 552b of memory. Finally, the upper portion of the RAMset containing data "3" is cleaned to copy the data to the newly mapped version of the RAMset as shown at 552b.

In each of the examples of FIGS. 15a-15d, both portions of the RAMset were cleaned to memory with some examples requiring a re-mapping of the RAMset and other examples not requiring a re-mapping. In some situations, however, only one portion (i.e. not both) of the RAMset needs to be cleaned to memory. Not having to clean the entire RAMset is faster than, and saves power compared to, the cleaning process in which the entire the RAMset is cleaned to memory. FIGS. 16a-16d provide examples in which only one portion of the multi-portion RAMset is cleaned to memory.

Figure 16A:
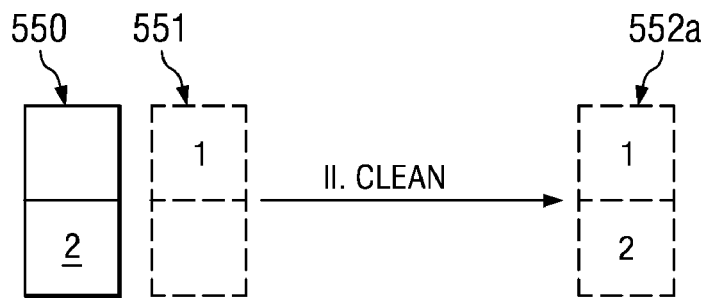
FIGS. 16a-16d show various examples of saving some of the contents of the RAMset to external memory upon a thread switch.

In FIG. 16a the bottom portion of the RAMset at 550 is the active portion and contains data labeled as "2," but the memory-mapped version of the RAMset at 551 contains previously cleaned data ("1") in the upper portion at 551. Thus, cleaning the RAMset requires only the bottom portion to be cleaned which is performed via the II.Clean command. The top portion of the RAMset does not have data "1" in a more updated form from what is in memory at 551 and consequently need not be cleaned upon a thread switch.

Figure 16B:
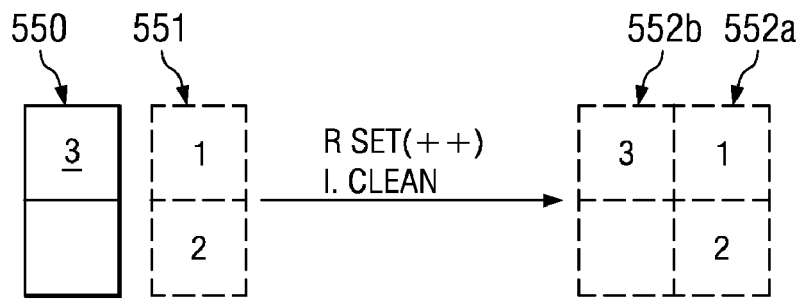

In FIG. 16b, the upper portion of the RAMset at 550 contains data labeled as "3," while the memory-mapped version at 551 of the RAMset contains previously cleaned data in both portions. Cleaning the RAMset in this situation requires that the RAMset be re-mapped via the R.Set(++) command to memory portion 552b and the upper portion cleaned via the I.Clean command. Again, only one portion of the RAMset is actively cleaned upon a thread switch.

Figure 16C:
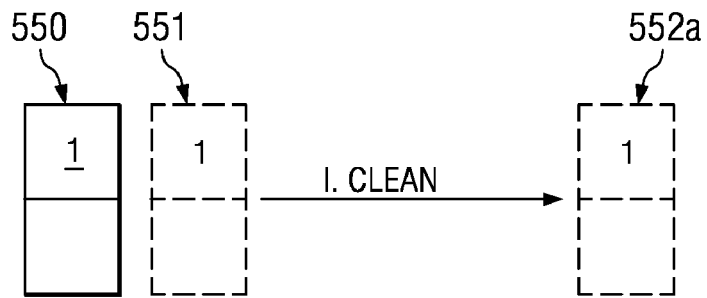

In FIG. 16c, only the upper portion of the RAMset 550 contains valid data. As illustrated in the memory-mapped version of the RAMset at 551, the upper portion of the RAMset (containing data "1") was previously cleaned to memory. If a thread switch is desired at this point, only a I.Clean command is needed to clean the RAMset's upper portion. This cleaning operation cleans the entire data "1" or only the dirty data within "1."

Figure 16D:
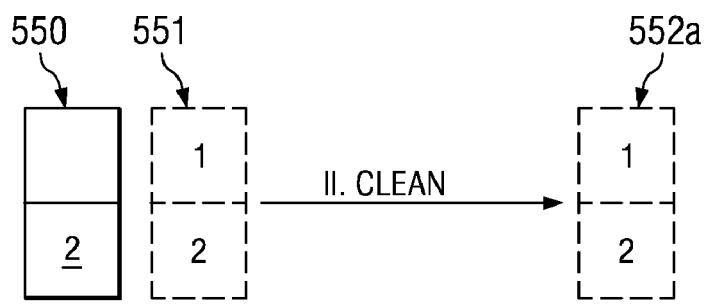

The example of FIG. 16d is similar to the example of FIG. 16c except that the valid data is in the lower portion of the RAMset and the memory-mapped version of the RAMset at 551 contains data in both portions. If a thread switch is desired at this point, only a II.Clean command is needed to clean the RAMset's lower portion. This cleaning operation cleans the entire data "2" or only the dirty data within "2."

The cleaning operations illustrated in FIGS. 15 and 16 depict saving the context associated with a thread so that the processor resources (e.g. the RAMset) can be used for execution of the new thread. Once the new thread ceases operation, control may switch back to the former thread. When this happens, a mechanism should be available by which the previously cleaned data associated with the former thread can be brought back into the RAMset. The upper and lower flush commands (I.Flush and II.Flush) as well as the R.Set and CP commands can be used in this regard (see Table I). For example, to reverse the cleaning operations of FIGS. 15a, 15d, 16b, and 16c, the following three commands are performed: the R.Set command, the I.Flush command, and the CP command. The R.Set command re-maps the RAMset to the appropriate portion memory to retrieve the previously cleaned data. The I.Flush command invalidates the upper portion of the RAMset so that any accesses into the upper portion of the RAMset will cause a cache miss to occur upon the initial access. The CP command causes the RAMset to be operated in the cache policy mode as explained above. As a result of these commands, the state of the RAMset will be state 708 (FIG. 14). With these commands, any attempt by the newly installed thread to access one of its local variables will initially cause a miss to occur into the RAMset, but the miss will be addressed by retrieving the target data from external memory. The retrieved data will be loaded back into the RAMset and the corresponding line of local variable data will be flagged as valid. Advantageously, only one portion of the RAMset needs to be invalidated to successfully reload the RAMset with the local variable data.

In FIGS. 15b, 15c, 16a, and 16d, local variable data is reloaded into the RAMset in those situations using the commands R.Set, II.Flush, and CP. As a result of these commands, the state of the RAMset will be state 714. The difference between these commands and the commands of the preceding paragraph is that only the bottom portion of the RAMset needs to be invalidated.

As explained above, a state variable is maintained to reflect the state of the RAMset for each of the states discussed herein. The value of the state variable preferably is unique to each of the various states and is used, at least in part, to determine the appropriate actions (e.g., II.Clean, R.set, etc.) to be performed as the RAMset transitions from one state to another. A separate state variable is maintained for each thread. That is, the various possible states of the RAMset for one thread is maintained by one state variable, while another state variable is used to establish the state of the RAMset when operating in another thread. Moreover, when a switch is made from one thread to another, the context of the former thread is saved as explained above including, or along with, that thread's state variable. The state variable of the new thread is then used from that point forward while the system operates in the new thread. When a switch is made back to the former thread, the state variable of the soon to be old thread is saved with its context and the former thread's context is re-loaded or otherwise re-used. The former thread's state variable is retrieved and adjusted to reflect a proper RAMset state. The proper RAMset state will be a state that permits the newly instituted thread's previously saved RAMset data to be retrieved from memory and reloaded into the RAMset. This new state may involve performing a flush command to invalidate the RAMset, an R.Set command to re-map the RAMset to the correct memory page and setting the RAMset mode to the CP mode to reload the previously saved data back into the RAMset.

While the preferred embodiments of the present invention have been shown and described, modifications thereof can be made by one skilled in the art without departing from the spirit and teachings of the invention. The scope of protection is not limited by the description set out above. Each and every claim is incorporated into the specification as an embodiment of the present invention.

What is claimed is:

1. A multi-threaded processor adapted to couple to external memory, comprising:
   a controller;
   data storage operated by said controller, said data storage comprises a first portion and a second portion, and wherein only one of said first or second portions is active at a time, the non-active portion being unusable;
   wherein, when the active portion does not have sufficient capacity for additional data to be stored therein, the other portion becomes the active portion; and
   wherein, upon a thread switch from a first thread to a second thread, only one of said first or second portions is cleaned, to the external memory if one of said first or second portions does not contain valid data.

2. The processor of claim 1 wherein, when said first and second portions of the data storage are used to store local variables associated with a stack-based programming language.

3. The processor of claim 1 wherein data contents of the first or second portion that is cleaned to the external memory are copied to a corresponding portion of a memory-mapped version of the data storage.

4. The processor of claim 1 wherein the data storage is mapped to a corresponding area of the external memory.

5. The processor of claim 4 wherein the data storage is re-mapped to a different area of the external memory before the first or second portion that is cleaned to the external memory is actually cleaned.

6. The processor of claim 1 wherein said data storage comprises cache memory.

7. The processor of claim 1 wherein if both portions of the data storage comprise valid data, then both portions are cleaned to the external memory upon a thread switch.

8. The processor of claim 7 wherein the data storage is re-mapped to a different area of the external memory before cleaning both portions or after cleaning one portion but before cleaning the other portion.

9. The processor of claim 1 wherein, upon a subsequent switch back to the first thread, the cleaned data is brought back into the data storage from the external memory.

10. A system, comprising:
    a communications transceiver;
    a controller;
    data storage operated by said controller, said data storage comprises a first portion and a second portion, and wherein only one of said first or second portions is active at a time, the non-active portion being unusable;
    wherein, when the active portion does not have sufficient capacity for additional data to be stored therein, the other portion becomes the active portion; and
    wherein, upon a thread switch from a first thread to a second thread, only one of said first or second portions is cleaned to the external memory if one of said first or second portions does not contain valid data.

11. The system of claim 10 wherein, when said first and second portions of the data storage are used to store local variables associated with a stack-based programming language.

12. The system of claim 10 wherein data contents of the first or second portion that is cleaned to the external memory are copied to a corresponding portion of a memory-mapped version of the data storage.

13. The system of claim 10 wherein the data storage is mapped to a corresponding area of the external memory.

14. The system of claim 13 wherein the data storage is re-mapped to a different area of the external memory before the first or second portion that is cleaned to the external memory is actually cleaned.

15. The system of claim 10 wherein said data storage comprises cache memory.

16. The system of claim 10 wherein if both portions of the data storage comprise valid data, then both portions are cleaned to the external memory upon a thread switch.

17. The system of claim 16 wherein the data storage is re-mapped to a different area of the external memory before cleaning both portions or after cleaning one portion but before cleaning the other portion.

18. The system of claim 10 wherein, upon a subsequent switch back to the first thread, the cleaned data is brought back into the data storage from the external memory.

19. The system of claim 10 wherein the system comprises a cellular telephone.

20. A method, comprising:
    using only a first portion of a cache memory data array to store local variables until said first portion has insufficient capacity for storing additional local variables, said cache memory data array comprising the first portion and a second portion;
    once the first portion has insufficient capacity for storing additional local variables, using only the second portion of the cache memory data to store said additional local variables and not using the first portion;
    when the second portion has insufficient capacity for storing additional local variables, copying the local variables from only the first portion to external memory;
    switching from a first thread to a second thread; and
    upon switching to the second thread, cleaning only one of said first or second portions to the external memory if one of said first or second portions does not contain valid data.

* * * * *

UNITED STATES PATENT AND TRADEMARK OFFICE
CERTIFICATE OF CORRECTION

PATENT NO. : 7,606,977 B2
APPLICATION NO. : 11/188411
DATED : October 20, 2009
INVENTOR(S) : Jean-Philippe Lesot et al.

Page 1 of 1

It is certified that error appears in the above-identified patent and that said Letters Patent is hereby corrected as shown below:

Title page, item (30) insert the following:

-- (30)  Foreign Application Priority Data

July 27, 2004  (EP) ................................................ 04291918.3 --

Signed and Sealed this

Ninth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,606,977 B2  Page 1 of 1
APPLICATION NO. : 11/188411
DATED : October 20, 2009
INVENTOR(S) : Lesot et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 976 days.

Signed and Sealed this

Twelfth Day of October, 2010

David J. Kappos
*Director of the United States Patent and Trademark Office*